United States Patent
Berkey et al.

(10) Patent No.: US 11,067,468 B2
(45) Date of Patent: Jul. 20, 2021

(54) ENHANCED RIG CHECK AND LEAK DETECTION OF AIRCRAFT DOORS

(71) Applicant: The Boeing Company, Chicago, IL (US)

(72) Inventors: Tyler Emerson Berkey, Charleston, SC (US); Emnet T. Gemechu, Moncks Corner, SC (US)

(73) Assignee: The Boeing Company, Chicago, IL (US)

(*) Notice: Subject to any disclaimer, the term of this patent is extended or adjusted under 35 U.S.C. 154(b) by 494 days.

(21) Appl. No.: 16/019,946

(22) Filed: Jun. 27, 2018

(65) Prior Publication Data
US 2020/0003651 A1   Jan. 2, 2020

(51) Int. Cl.
| | |
|---|---|
| *B64C 1/14* | (2006.01) |
| *G01M 3/26* | (2006.01) |
| *F16J 15/10* | (2006.01) |
| *G01M 3/16* | (2006.01) |

(52) U.S. Cl.
CPC .............. *G01M 3/26* (2013.01); *B64C 1/143* (2013.01); *F16J 15/102* (2013.01); *G01M 3/16* (2013.01)

(58) Field of Classification Search
CPC . G01M 3/26; G01M 3/16; G01M 3/24; B64C 1/143; F16J 15/02
See application file for complete search history.

(56) References Cited

U.S. PATENT DOCUMENTS

| | | | | |
|---|---|---|---|---|
| 2,660,053 A | * | 11/1953 | Buehner | G01M 3/088 73/40 |
| 2,885,039 A | * | 5/1959 | MacFarland, Jr. | B64C 1/1407 52/127.11 |
| 3,004,303 A | * | 10/1961 | Wilmer | B64C 1/14 49/249 |
| 3,791,073 A | * | 2/1974 | Baker | B64C 1/1407 49/249 |
| 4,199,120 A | * | 4/1980 | Bergman | B64C 1/1407 244/129.5 |
| 4,720,065 A | * | 1/1988 | Hamatani | B64C 1/1407 244/129.5 |
| 5,404,747 A | * | 4/1995 | Johnston | G01M 3/24 73/40 |
| 6,059,230 A | * | 5/2000 | Leggett | B64C 1/1446 244/129.4 |
| 2006/0143890 A1 | | 7/2006 | Linnemann et al. | |
| 2008/0164373 A1 | * | 7/2008 | Roming | B64C 1/14 244/129.5 |

(Continued)

FOREIGN PATENT DOCUMENTS

| | | | |
|---|---|---|---|
| FR | 3041893 | * | 4/2017 |
| FR | 3041893 A1 | | 4/2017 |

*Primary Examiner* — Justin M Benedik
(74) *Attorney, Agent, or Firm* — Duft & Bornsen, PC (57) ABSTRACT

Systems and methods for leak detection of aircraft doors. One embodiment is an apparatus for leak testing a seal between an aircraft door and a fuselage of an aircraft. The apparatus includes a structural frame that includes a suction cup configured to suction an outer surface of the aircraft door. The structural frame further includes legs to extend in length to push the structural frame away from the fuselage and cause the suction cup to pull the aircraft door toward an outside of the aircraft to tighten the seal between the aircraft door and the fuselage of the aircraft.

20 Claims, 8 Drawing Sheets

(56) References Cited

U.S. PATENT DOCUMENTS

| | | | |
|---|---|---|---|
| 2014/0345199 A1* | 11/2014 | Yahata | B64C 1/14 49/475.1 |
| 2016/0041050 A1 | 2/2016 | Vera et al. | |

* cited by examiner

ENHANCED RIG CHECK AND LEAK DETECTION OF AIRCRAFT DOORS

FIELD

The disclosure relates to the field of aircrafts, and in particular, to leak detection of aircraft doors.

BACKGROUND

Commercial aircrafts generally have at least one door for passengers to enter and exit the cabin. To ensure that the door is properly sealed, the aircraft may be taken on a test flight to pressurize the cabin and check for air leaks. Alternatively, the aircraft may be checked for leaks on the ground by disassembling interior components of the aircraft door and door surround, rigging a series of clamps to the exposed interior to seal the aircraft door and the door surround, testing the seal, and reassembling the aircraft door and the door surround. Unfortunately, both options for testing the aircraft door for leaks are expensive and time consuming.

SUMMARY

Embodiments described herein provide enhanced leak detection of an aircraft door. With the aircraft grounded, a leak detection device engages the outside of the aircraft, suctions to the aircraft door, and pulls the door to tighten its seal. Testing of the seal may therefore be performed without pressurizing the aircraft via a test flight or rigging and clamping the interior of the aircraft door and door surround. Additionally, the leak detection device may include gasket channels adapted to fit with the aircraft door and the door surround to test the aircraft door for leaks from outside the aircraft. The gasket channels may be segmented to facilitate locating specific areas around the aircraft door susceptible to air leaks. Advantageously, an aircraft or fleet of aircrafts may be more frequently tested for air leaks during assembly or maintenance in a simplified, effective, and economical manner.

One embodiment is an apparatus for leak testing a seal between an aircraft door and a fuselage of an aircraft. The apparatus includes a structural frame including a suction cup configured to suction an outer surface of the aircraft door, and legs configured to extend in length to push the structural frame away from the fuselage and cause the suction cup to pull the aircraft door toward an outside of the aircraft to tighten the seal between the aircraft door and the fuselage of the aircraft.

Another embodiment is a method for leak testing a seal between an aircraft door and a fuselage of an aircraft. The method includes aligning a structural frame with respect to the aircraft door, the structural frame including a middle section aligning with the aircraft door and support members aligning with the fuselage on different sides of the aircraft door. The method also includes coupling the middle section of the structural frame with an outer surface of the aircraft door, and driving the support members of the structural frame to apply a force perpendicular to the fuselage to pull the aircraft door via the coupling and to tighten the seal between the aircraft door and the fuselage. The method further includes engaging a gasket channel with an outer periphery of the aircraft door to fluidly couple with the seal, altering pressure in the gasket channel fluidly coupled with the seal; and detecting a leak in the seal based on a pressure measurement of the gasket channel fluidly coupled with the seal.

Yet another embodiment is a system for an aircraft door situated in a fuselage of an aircraft. The system includes a structural frame to engage an outer surface of the aircraft door, the structural frame supported over the aircraft door via support members configured to contact the fuselage of the aircraft at opposing sides of the aircraft door. The system also includes a coupler to temporarily couple the structural frame with the aircraft door. The support members are configured to extend to lift the structural frame and draw the aircraft door outwards to simulate a position of the aircraft door relative to the fuselage during flight of the aircraft.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
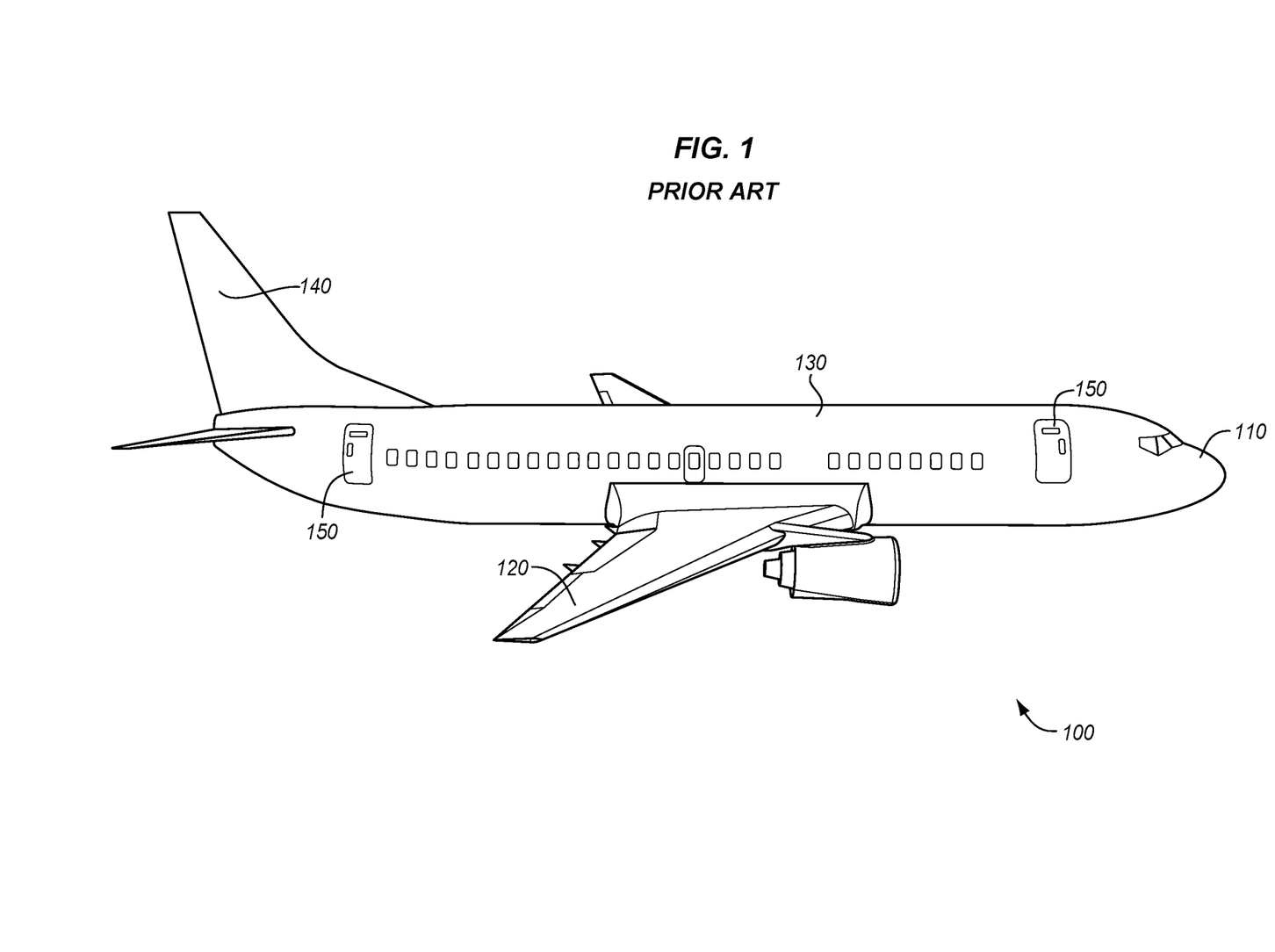
FIG. 1 illustrates an aircraft.

FIG. 1 illustrates an aircraft 100. The aircraft 100 includes a nose 110, wings 120, a fuselage 130, and a tail 140. The aircraft 100 also includes one or more aircraft doors 150. In general, the aircraft door 150 is mounted in an opening (not shown) of the fuselage 130. The aircraft door 150 may include a passenger door configured to open and close to allow persons to enter and exit the aircraft 100.

Figure 2A:
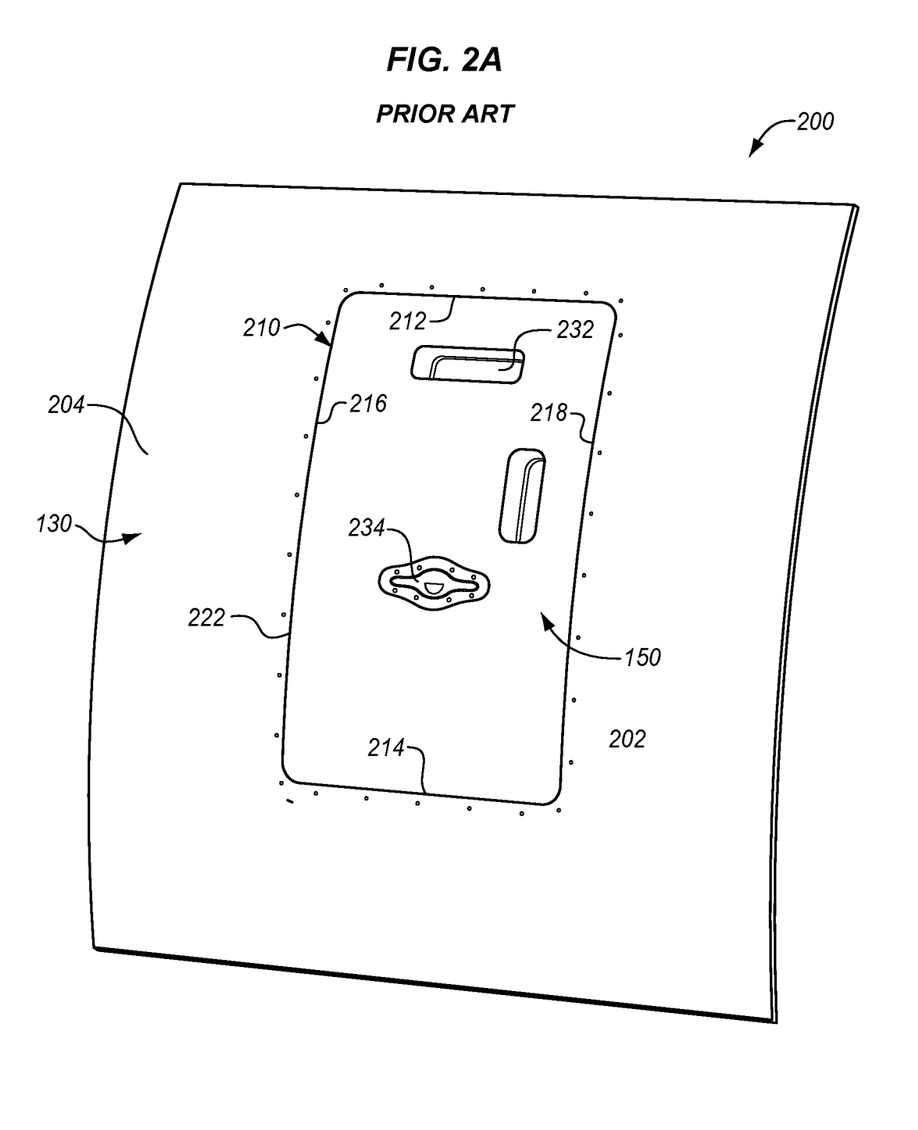
FIG. 2A is an outboard view of the aircraft door.

FIG. 2A is an outboard view 200 of the aircraft door 150. FIG. 2A shows the aircraft door 150 in a closed position such that an outer surface 202 of the aircraft door 150 is substantially flush or coplanar with an external surface 204 of the fuselage 130. That is, the outer surface 202 (sometimes referred to as an outer panel or skin) of the aircraft door 150 may be defined by a perimeter 210 (sometimes referred to as outer periphery) including a top edge 212, a bottom edge 214, and side edges 216-218. Thus, with the aircraft door 150 shut, a gap 222 between the aircraft door 150 and the fuselage 130 may form around the perimeter 210 outside the aircraft 100. The aircraft door 150 may also include a window 232 and/or an exterior handle 234.

Figure 2B:
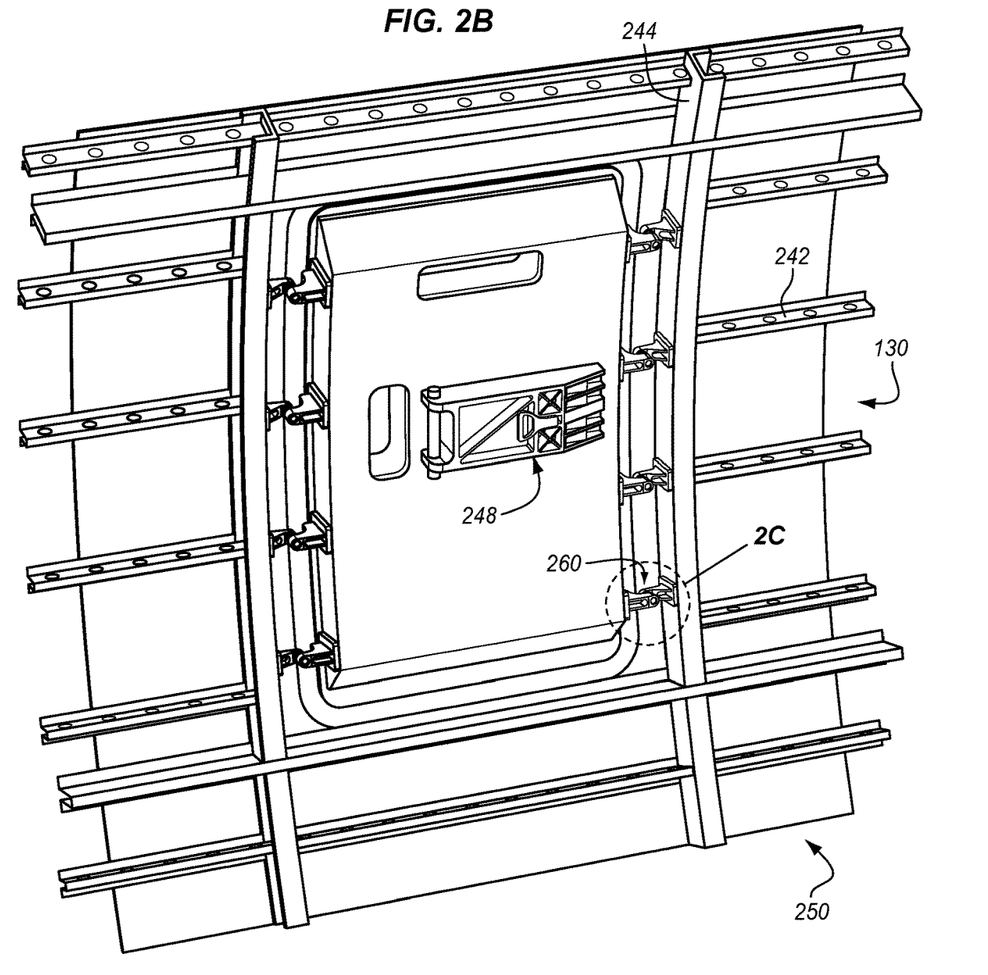
FIG. 2B is an inboard view of the aircraft door.

FIG. 2B is an inboard view 250 of the aircraft door 150. FIG. 2B shows various internal components of the aircraft door 150 and the fuselage 130 (without coverings, insulation, etc.) for clarity and purposes of discussion. For instance, the fuselage 130 includes stringers 242 to provide longitudinal support of the skin, and ribs 244 to provide hoop-wise skin support. The aircraft door 150 is seated within the door surround or frame of the fuselage 130 and includes a latch lock assembly 248 to open and secure the aircraft door 150 via an interior handle, latch shafts, etc. Numerous configurations of opening, closing, and latching the aircraft door 150 are possible.

Figure 2C:
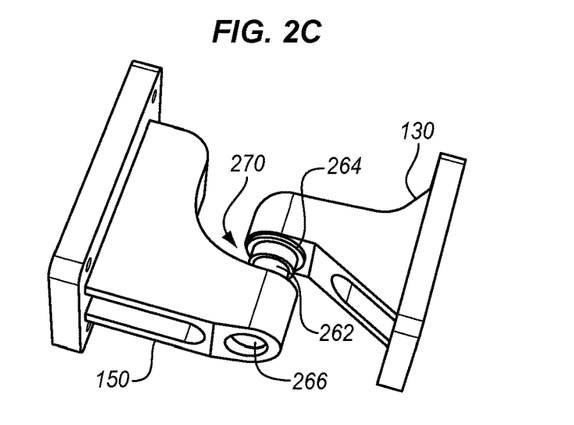
FIG. 2C illustrates a door stop of an aircraft door.

The aircraft door 150 is secured with the fuselage 130 via door stops 260. FIG. 2C illustrates a door stop of an aircraft door. The door stops 260 each include stop pins 262, stop pads 264, and pin lock wires 266. The stop pins 262 extend from the aircraft door 150 and align with corresponding stop pads 264 on the fuselage 130 to secure the aircraft door 150. During flight, cabin pressure forces the aircraft door 150 outwardly, thereby forcing the stop pins 262 into the stop pads 264 to secure the aircraft door 150 and to form a seal 270 between the aircraft door 150 and the fuselage 130. In general, the seal 270 may be properly formed if it prevents air leakage from the gap 222 of the aircraft 100. The seal 270 may form around the perimeter 210 of the aircraft door 150 but, unlike the gap 222, may not be visible from outside the aircraft 100.

One prior technique for verifying the operational integrity of the seal 270 is to test the seal 270 while the cabin is pressurized on a test flight. However, test flights tend to be quite expensive and are difficult to perform frequently. Another prior technique for verifying the operational integrity of the seal 270 includes rigging the interior of the aircraft door 150 to install mechanical clamps that clamp the door stops 260 to form the seal 270. This involves disassembling interior components surrounding the aircraft door 150 to install the clamps on the door stops 260 inside the aircraft door 150. Although a test flight operation may be avoided this way, this technique requires significant time and labor to disassemble and reassemble the door components. Therefore, improved techniques and devices for testing the seal 270 are desirable.

Figure 3:
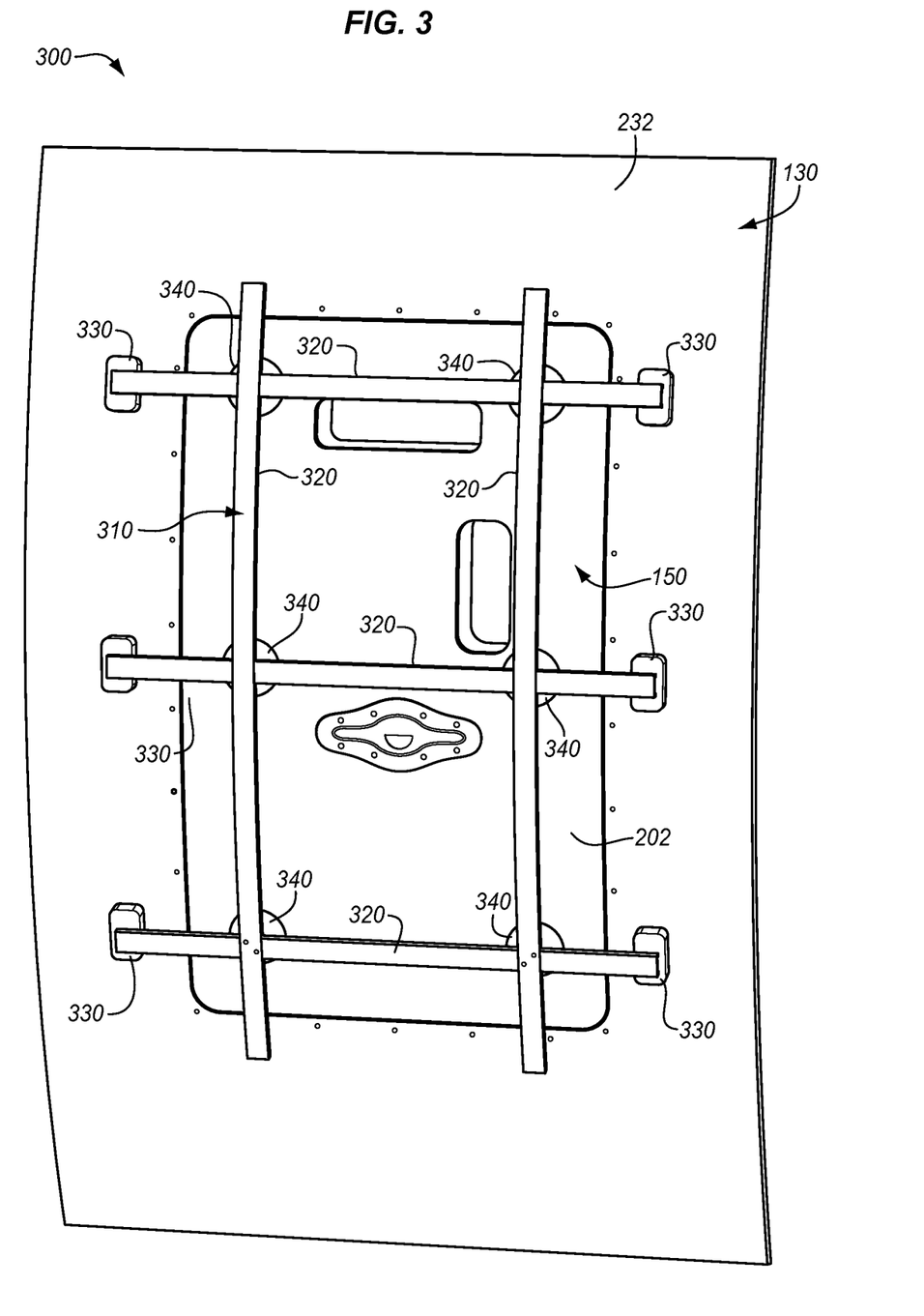
FIG. 3 illustrates a testing device for the aircraft door in an illustrative embodiment.

FIG. 3 illustrates a testing device 300 for the aircraft door 150 in an illustrative embodiment. FIG. 3 shows an outboard view of the testing device 300 engaged with the aircraft door 150. The testing device 300 provides an advantage over prior techniques by enabling the aircraft door 150 to be pulled into full engagement with the door stops 260 from the outside of the aircraft 100, therefore enabling testing of the the rigging and/or leak detection without flying the aircraft 100 or disassembling the aircraft door 150. Accordingly, the testing device 300 may facilitate rigging of the aircraft door 150 with respect to the fuselage 130 to properly form the gap 222 and enable leak detection along the gap 222 between the aircraft door 150 and the fuselage 130 for testing the seal 270. Although rigging and leak detection may be related and complimentary to each other, testing of each of the rigging and leak detection may be performed separately or in combination.

In general, the testing device 300 includes a structural frame 310 of one or more crossbars 320 extending lengthwise across the aircraft door 150. A crossbar 320 may be supported at either end by legs 330 that contact the fuselage 130 at opposing sides of the aircraft door 150. The legs 330 may thus support the structural frame 310, including the crossbars 320, over the aircraft door 150. The testing device 300 further includes one or more suction cups 340 configured to suction the aircraft door 150. The suction cups 340 may be mechanically coupled or attached to the bottom side of the structural frame 310 and pressed with the structural frame 310 onto the outer surface 202 to engage the aircraft door 150 via suctioning. With the suction cups 340 suctioned to the aircraft door 150, the legs 330 may be operated to extend in length to lift the structural frame 310 away from the fuselage 130, thereby pulling the aircraft door 150 via the suction cups 340. The legs 330 may include numerous types of height-adjustable components, such as screw jacks, tension levers, etc. The legs 330 may be manually operated or operated with the assistance of actuators, hydraulics, motors, etc.

The pulling force applied to the aircraft door 150 draws the aircraft door 150 outwardly similar to that as if the aircraft 100 were pressurized in flight. That is, the legs 330 may extend a distance that corresponds with a force applied to the aircraft door 150 that simulates inflight cabin pressure of the aircraft 100. The testing device 300 thus advantageously replicates formation of the seal 270 between the aircraft door 150 and the fuselage 130 during flight to enable testing the seal 270 for leaks without flying the aircraft 100 or disassembling the aircraft door 150. Additionally, by pulling the aircraft door 150 onto the door stops 260, the rig of the aircraft door 150 as well as any leaks in the seal 270 may be tested.

Figure 4:
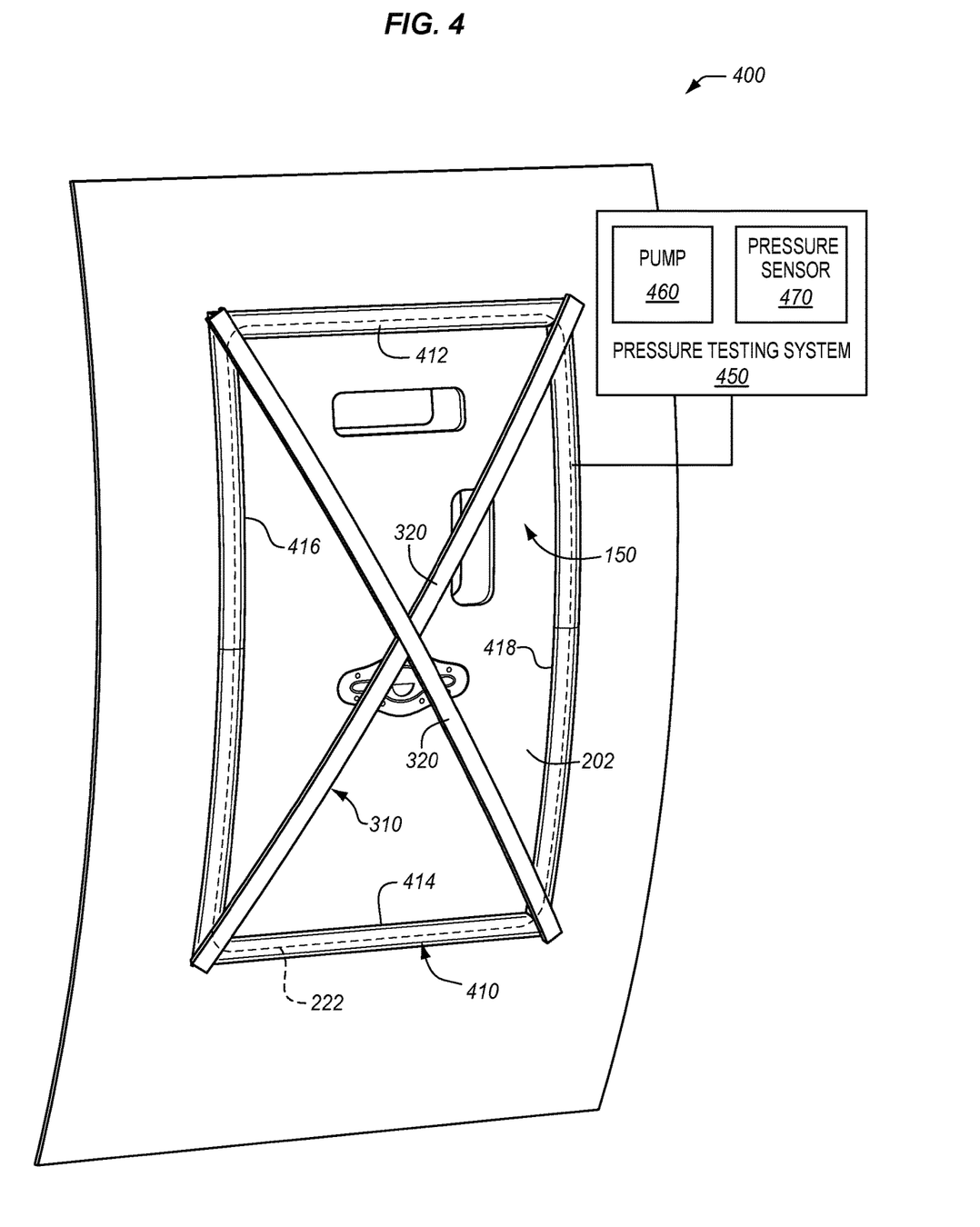
FIG. 4 illustrates a leak testing device for the aircraft door in an illustrative embodiment.

FIG. 4 illustrates a leak testing device 400 for the aircraft door 150 in another illustrative embodiment. As shown by this example, the leak testing device 400 may alternatively or additionally include components which facilitate testing of the seal 270 while the aircraft door 150 is properly seated with respect to the fuselage 130. The structural frame 310 may include one or more gasket channels 410 having a size and shape to engage the gap 222 between the aircraft door 150 and the fuselage 130. That is, the gasket channel 410 may attach to the bottom side of the structural frame 310 and have a size which corresponds with the perimeter 210 of the aircraft door 150 to fluidly couple with the seal 270 around the aircraft door 150.

Additionally, the gasket channel 410 is configured to fluidly couple with a pressure testing system 450 including one or more pumps 460 and/or one or more pressure sensors 470. The pump 460 may include any system or device configured to alter pressure in the gasket channel 410. For example, the pump 460 may include a vacuum generator to decrease pressure in the gasket channel 410 fluidly coupled with the seal 270 or an alternative positive displacement pump to increase pressure in the gasket channel 410 fluidly coupled with the seal 270. The pressure sensor 470 may include any device to measure the pressure in the gasket channel 410, such as a vacuum pressure sensor, a gauge pressure sensor, an absolute pressure sensor, etc.

With the pump 460 and the pressure sensor 470 fluidly coupled with the seal 270 via the gasket channel 410, the pressure testing system 450 may detect whether the seal 270 is improperly leaking air. For example, the pump 460 may apply a pressure in the gap 222 (e.g., via suctioning with a vacuum) to simulate pressure applied to the seal 270 between the aircraft door 150 and the fuselage 130 during flight of the aircraft 100. And, the pressure sensor 470 may indicate a leak in the seal 270 based on a decline of absolute pressure measured in the gasket channel 410 fluidly coupled with the seal 270 while the pump 460 operates (e.g., during suctioning with the vacuum). In some embodiments, the leak testing device 400 integrates or includes one or more components of the pressure testing system 450. Alternatively or additionally, the gasket channel 410 may include fluid fittings (e.g., barbed hose fitting) for fluidly coupling (e.g., via hose) with one or more components of the pressure testing system 450.

In some embodiments, the gasket channel 410 includes channel segments 412-418 fluidly isolated from one another. That is, the channel segments 412-418 may each fluidly couple separately with the gap 222 and seal 270 at different portions of the perimeter 210 of the aircraft door 150. For example, the gasket channel 410 may include a top channel segment 412, a bottom channel segment 414, and side channel segments 416-418 corresponding with a top edge 212, a bottom edge 214, and side edges 216-218 of the aircraft door 150, respectively.

Additionally, each of the channel segments 412-418 may fluidly connect with a corresponding pressure sensor 470 and/or pump 460. With separate pressure sensors 470 (or separate gauges of the pressure sensor 470) fluidly coupled with corresponding channel segments 412-418, the pressure sensor 470 is configured to indicate a particular leak location in the seal 270. For example, the pressure sensor 470 may detect occurrence of undesirable leak at a particular portion of the perimeter 210 of the aircraft door 150 based on a difference in pressure in one of the channel segments 412-418 covering that portion of the perimeter relative to pressure in other channel segments 412-418. Advantageously, performance of the seal 270 may be evaluated at discrete locations around the perimeter 210 of the aircraft door 150 to facilitate the quick identification of leak locations and appropriate remedy.

The example of FIG. 4 also illustrates that, similar to that already described above with respect to FIG. 3, the leak testing device 400 may include the structural frame 310 with one or more crossbars 320 each sized to extend across at least some portion of the aircraft door 150. The crossbars 320 may be oriented over the aircraft door 150 and intersect with one another in a variety of configurations, and may be supported by legs 330 (not shown in FIG. 4) disposed at different sides of the aircraft door 150 on the fuselage 130, and/or may be supported by other crossbars 320. End portions of the crossbars 320 may provide attachment points to support the gasket channel 410 (or plurality of gasket channels 410 in segmented configurations).

Figure 5:
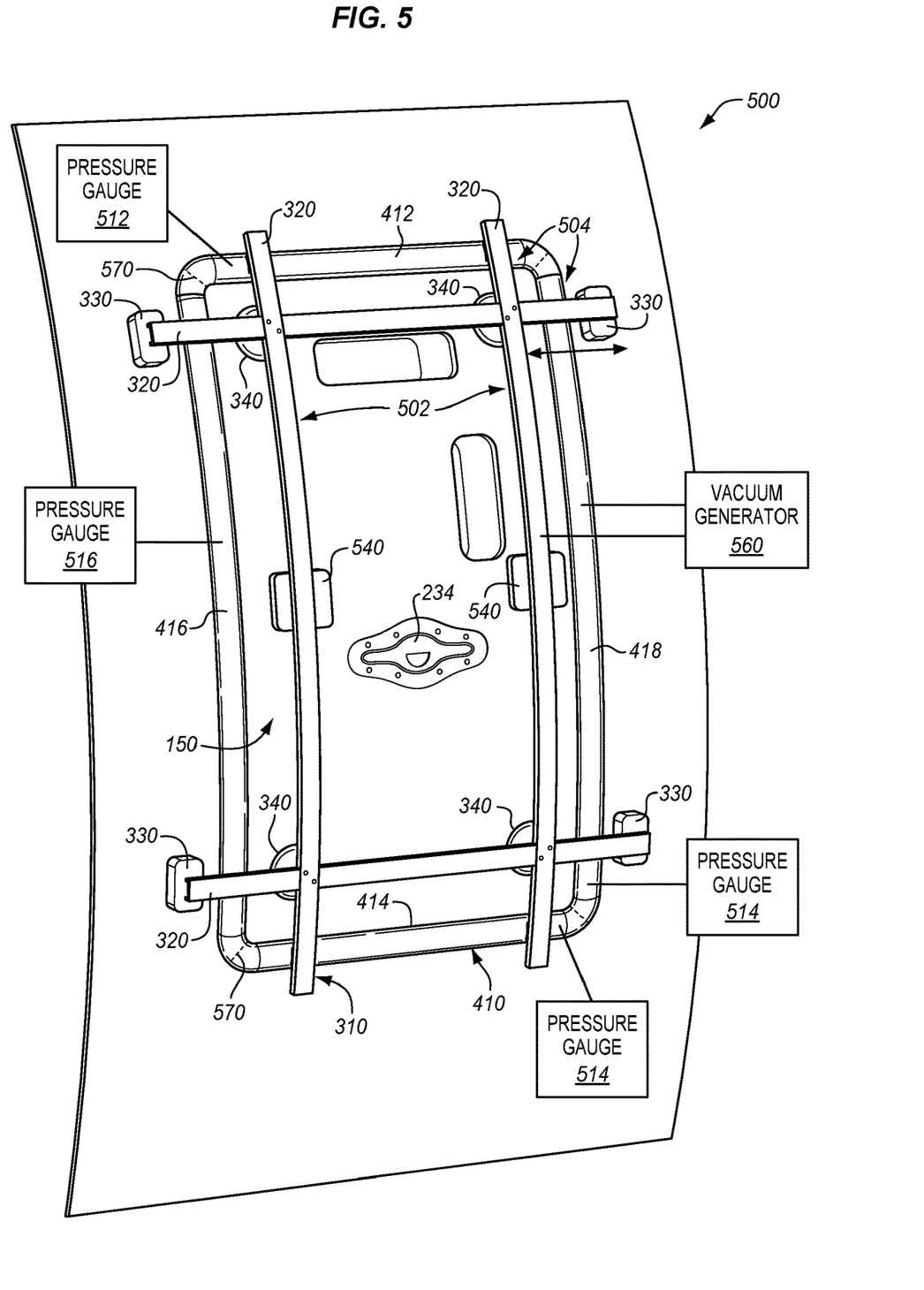
FIG. 5 illustrates a leak testing device for the aircraft door in yet another illustrative embodiment.

FIG. 5 illustrates a leak testing device 500 for the aircraft door 150 in yet another illustrative embodiment. FIG. 5 shows an example embodiment of the leak testing device 500 that includes a combination of the features described above with respect to FIG. 3 and FIG. 4 along with additional or alternative features. The leak testing device 500 includes the structural frame 310 sized to straddle the aircraft door 150 with crossbars 320 intersecting one another. The intersection of the crossbars 320 may define middle portions 502 and end portions 504 of each of the crossbars 320. Generally, with the leak testing device 500 aligned over the aircraft door 150, the middle portions 502 collectively form a middle section of the structural frame 310 and are disposed within the lateral dimension of the aircraft door 150 and the end portions 504 branch from the middle section and may be partially disposed outside the lateral dimension of the aircraft door 150 (and above the door surround/frame of the fuselage 130). The end portions 504 may include or attach with the legs 330. Additionally, one or more of the crossbars 320 may be configured to extend and retract in length to adjustably position the end portions 504 (as shown by the directional arrows) and adaptively size the structural frame 310 to different sizes and types of aircraft doors.

The crossbars 320 may include the suction cups 340 at or near the intersections of the crossbars 320. The crossbars 320 may also include one or more suction cups 340 along the middle portions 502. One or more of the suction cups 340 may include a vacuum suction cup fluidly coupled with a vacuum generator 560 to suction the aircraft door 150. In some embodiments, the vacuum generator 560 (or the pump 460) may be configured to vacuum both the suction cup(s) 340 and the gasket channel(s) 410. Alternatively or additionally, the crossbars 320 may include one or more couplers 540 to temporarily couple the structural frame 310 with the aircraft door 150 such as a mechanical attachment to temporarily engage the exterior handle 234 for pulling of the aircraft door 150 from outside the aircraft 100.

The gasket channel 410 may form a continuous or substantially continuous loop around the structural frame 310 and attach to the underside of the structural frame 310 at the end portions 504 of the crossbars 320. The gasket channel 410 may be segmented by walls 570 or abutting ends that define the channel segments 412-418. In one embodiment, the channel segments 412-418 may be connected and disconnected from one another via jointed ends or corners. As earlier described, each of the channel segments 412-418 may be fluidly connected with corresponding pressure gauges 512-518 to pinpoint leak locations. The gasket channel 410 may be formed via an additive manufacturing process with a material configured to adjustably contour to the gap 222 and close the seal 270 from the external environment of the aircraft 100.

Figure 6:
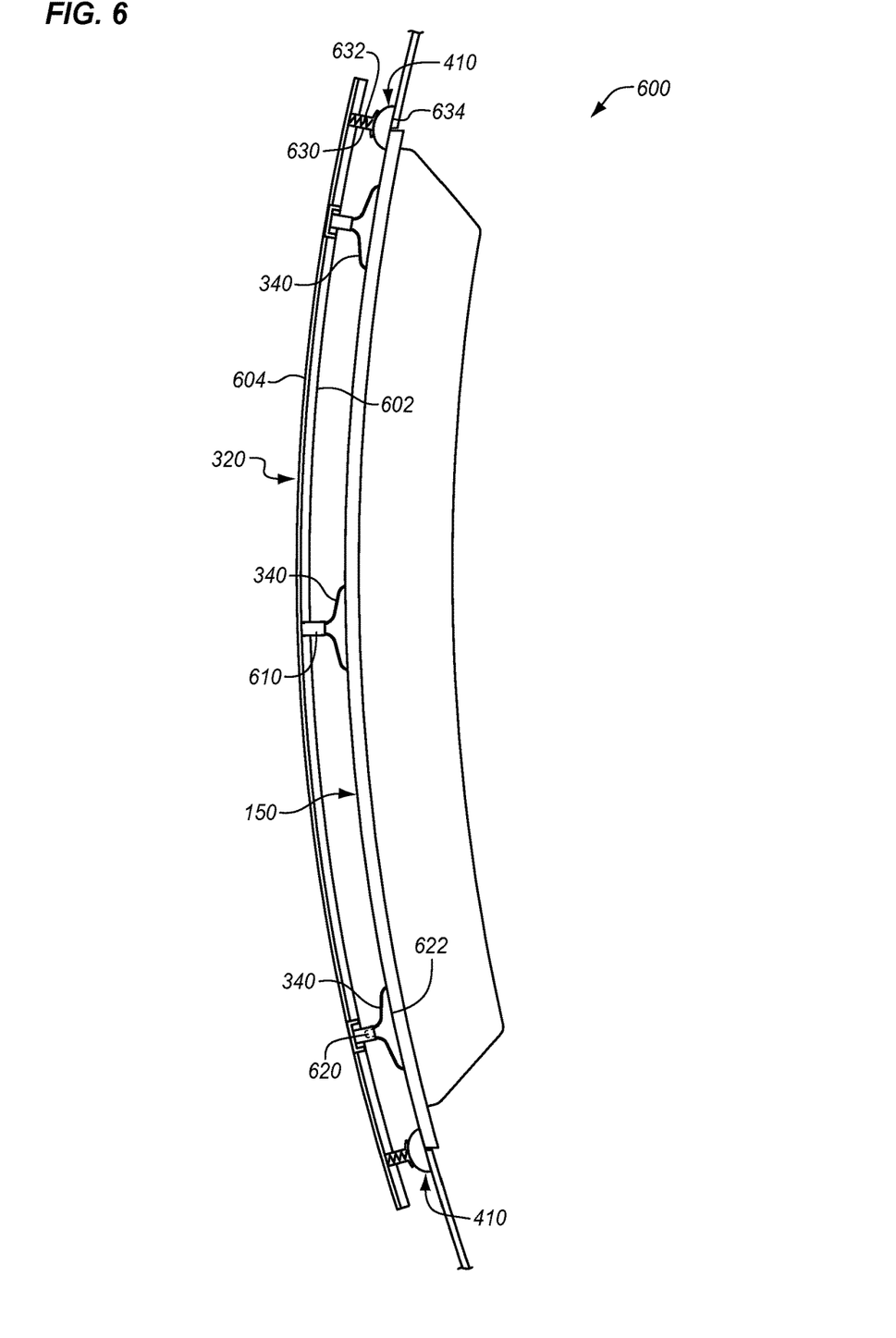
FIG. 6 is a side view of the leak testing device in an illustrative embodiment.

FIG. 6 is a side view of a leak testing device 600 in an illustrative embodiment. As shown in this example, components of the leak testing device 600, including the structural frame 310 and the crossbars 320, may be shaped or oriented to correspond with or match the curvature of the external surface of the aircraft 100. Each of the suction cups 340 may be attached to a bottom side 602 of the structural frame 310 via a t-bar 610 and a pivot joint 620. The bottom side 602 is generally the aircraft-facing side of the structural frame 310 and the crossbars 320 that is opposite to the top side 604. The t-bar 610 extends perpendicularly from the crossbar 320 and mechanically couples the suction cup 340 with the crossbar 320 and structural frame 310. The pivot joint 620 enables rotation of the suction cup 340 about the t-bar 610 to orient a suctioning surface 622 of the suction cup 340 according to the surface curvature of the aircraft door 150, thereby facilitating secure engagement for pulling the aircraft door 150.

The gasket channel 410 may include one or more floating mounts 630 attached to the bottom side 602 of the crossbar 320. The floating mount 630 includes a spring 632 to provide a spring contact force between an engagement surface 634 of the gasket channel 410 and the external surface of the aircraft 100. The floating mount 630 thus advantageously facilitates maintained contact and alignment between the gasket channel 410 and the gap 222 of the aircraft door 150 as the leak testing device 600 pulls the aircraft door 150 to form the seal 270.

Although particular example configurations of the leak testing device are shown and described in FIGS. 3-6 for purposes of discussion, alternative configurations, combinations and numbers of components are possible. Also, embodiments described herein may apply to an aircraft passenger door or alternative types of aircraft doors such as a cargo door, an emergency exit door, a hatch, etc. Illustrative details of operating the leak testing device are described below.

Figure 7:
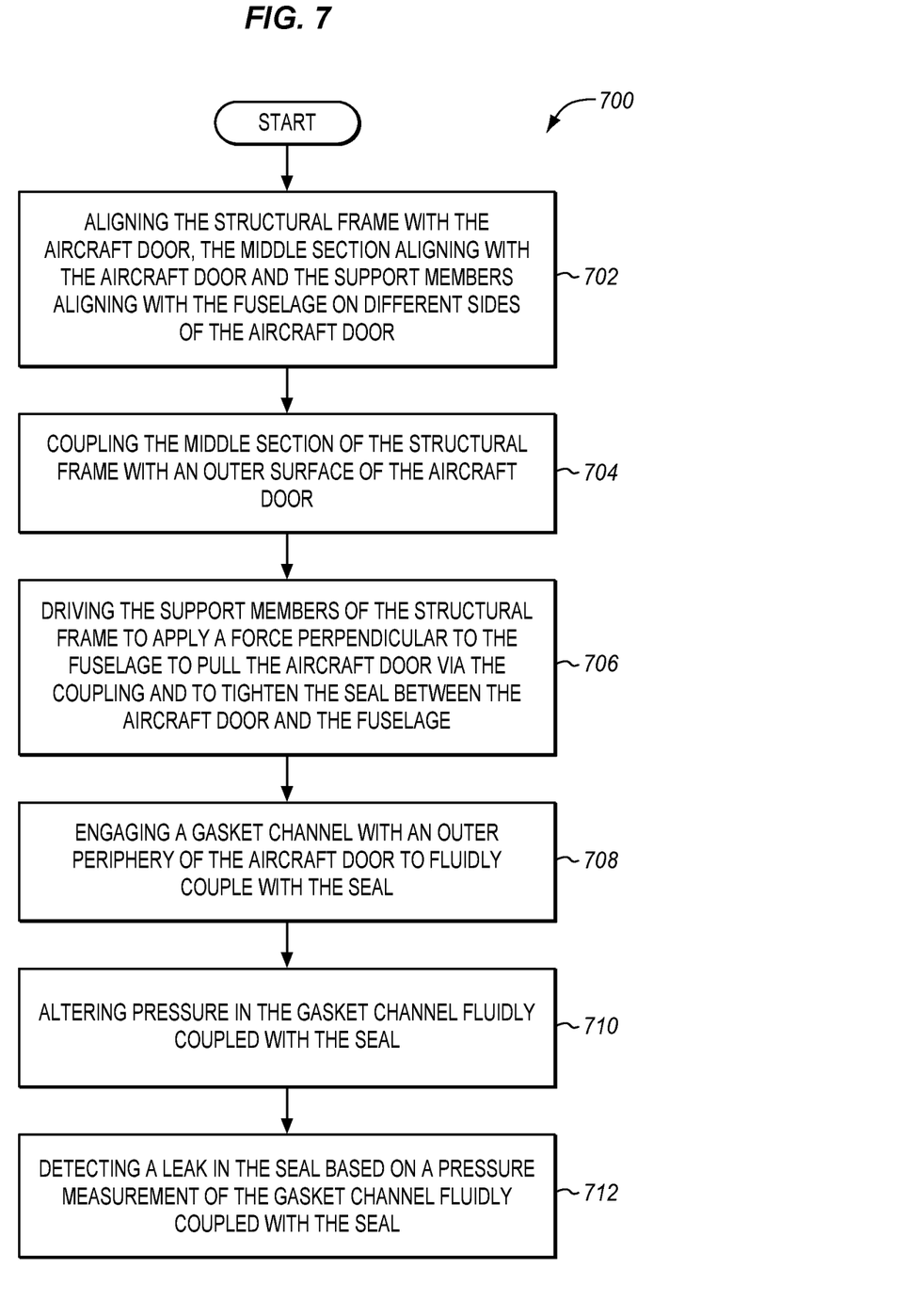
FIG. 7 is a flowchart illustrating a method for leak testing a seal between an aircraft door and a fuselage of an aircraft in an illustrative embodiment.

FIG. 7 is a flowchart illustrating a method 700 for leak testing a seal between an aircraft door and a fuselage of an aircraft in an illustrative embodiment. The steps of method 700 are described with reference to the testing device and leaking testing device of FIGS. 3-6, but those skilled in the art will appreciate that method 700 may be performed in other systems. The steps of the flowcharts described herein are not all inclusive and may include other steps not shown. The steps described herein may also be performed in an alternative order.

In step 702, the structural frame 310 is aligned with respect to the aircraft door 150, the structural frame 310 including a middle section aligning with the aircraft door 150 and support members (e.g., legs 330) aligning with the fuselage 130 on different sides of the aircraft door 150. Step 702 may include adjusting a length of the structural frame from one support member to another support member (e.g., opposite support member across the aircraft door 150) to span the structural frame 310 across the aircraft door 150.

In step 704, the middle section of the structural frame 310 is coupled with the outer surface 202 of the aircraft door 150. Step 704 may include engaging one or more suction cups 340 attached to the structural frame 310 with the outer surface 202 of the aircraft door 150, and suctioning the outer surface 202 of the aircraft door 150 via the suction cups 340 and a vacuum.

In step 706, the support members are driven to apply a force perpendicular to the fuselage 130 to pull the aircraft door 150 via the coupling and to tighten the seal 270 between the aircraft door 150 and the fuselage 130. Step 706 may include extending the support members for a distance that corresponds with an applied force on the aircraft door 150 that simulates inflight cabin pressure of the aircraft.

In step 708, the gasket channel 410 is engaged with an outer periphery of the aircraft door 150 to fluidly couple with the seal 270. In step 710, pressure is altered in the gasket channel 410 fluidly coupled with the seal 270. Step 710 may include suctioning the gasket channel 410 fluidly coupled with the seal 270 with a vacuum.

In step 712, a leak is detected in the seal 270 based on a pressure measurement of the gasket channel 410 fluidly coupled with the seal 270. Step 712 may include detecting a location of the leak in the seal based on segments in the gasket channel at different locations of the outer periphery of the aircraft door.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus for leak testing a seal between an aircraft door and a fuselage of an aircraft, the apparatus comprising:
    a structural frame including:
        a suction cup configured to suction an outer surface of the aircraft door;
        legs configured to extend in length to push the structural frame away from the fuselage and cause the suction cup to pull the aircraft door toward an outside of the aircraft to tighten the seal between the aircraft door and the fuselage of the aircraft; and
        a gasket channel on a bottom side of the structural frame, the gasket channel sized to correspond with an outer periphery of the aircraft door to fluidly couple with the seal between the aircraft door and the fuselage.

2. The apparatus of claim 1 wherein:
    the structural frame further includes:
        a crossbar sized to straddle the aircraft door outside the aircraft, wherein the crossbar couples with the legs at either end of the crossbar, and wherein the crossbar couples with the suction cup at a location between the legs.

3. The apparatus of claim 1 further comprising:
    a pump configured to alter pressure in the gasket channel fluidly coupled with the seal; and
    a pressure sensor configured to measure pressure in the gasket channel fluidly coupled with the seal for detecting a leak in the seal.

4. The apparatus of claim 3 wherein:
    the gasket channel includes channel segments that each fluidly couple separately with the seal at different portions of the outer periphery of the aircraft door; and
    the pressure sensor is configured to indicate a location of the leak based on a difference in pressure in one channel segment relative to others of the channel segments.

5. The apparatus of claim 3 wherein:
    the pump includes a vacuum configured to suction the gasket channel fluidly coupled with the seal; and
    the pressure sensor is configured to detect the leak in the seal based on a decline of absolute pressure measured in the gasket channel fluidly coupled with the seal during suctioning with the vacuum.

6. The apparatus of claim 1 wherein:
the legs extend a distance that corresponds with a force applied to the aircraft door that simulates inflight cabin pressure of the aircraft.

7. The apparatus of claim 1 wherein:
the legs are attached to end portions of a crossbar of the structural frame; and
the suction cup is attached to a middle portion of the crossbar.

8. The apparatus of claim 1 wherein:
the structural frame including:
a plurality of crossbars with at least one crossbar being extendable for different sizes of the aircraft door; and
one or more suction cups mechanically coupled with one of the crossbars via a joint to pivot the one or more suction cups according to a curvature of the outer surface of the aircraft door.

9. The apparatus of claim 1 wherein:
the structural frame including:
one or more floating mount supports attached to a bottom side of the structural frame, the one or more floating mount supports having springs to provide a spring contact force between the aircraft door and the structural frame to facilitate alignment of the structural frame with respect to the aircraft door while the suction cup pulls the aircraft door.

10. A method for leak testing a seal between an aircraft door and a fuselage of an aircraft, the method comprising:
aligning a structural frame with respect to the aircraft door, the structural frame including a middle section aligning with the aircraft door and support members aligning with the fuselage on different sides of the aircraft door;
coupling the middle section of the structural frame with an outer surface of the aircraft door;
driving the support members of the structural frame to apply a force perpendicular to the fuselage to pull the aircraft door via the coupling and to tighten the seal between the aircraft door and the fuselage;
engaging a gasket channel with an outer periphery of the aircraft door to fluidly couple with the seal;
altering pressure in the gasket channel fluidly coupled with the seal; and
detecting a leak in the seal based on a pressure measurement of the gasket channel fluidly coupled with the seal.

11. The method of claim 10 wherein:
the driving includes extending the support members for a distance that corresponds with an applied force on the aircraft door that simulates inflight cabin pressure of the aircraft.

12. The method of claim 10 wherein:
the coupling includes engaging one or more suction cups attached to the structural frame with the outer surface of the aircraft door, and suctioning the outer surface of the aircraft door via the one or more suction cups and a vacuum.

13. The method of claim 10 further comprising:
detecting a location of the leak in the seal based on segments in the gasket channel at different locations of the outer periphery of the aircraft door.

14. The method of claim 10 wherein:
the altering of the pressure includes suctioning the gasket channel fluidly coupled with the seal with a vacuum.

15. The method of claim 10 wherein:
the aligning of the structural frame with respect to the aircraft door includes adjusting a length of the structural frame from one support member to another support member to span the structural frame across the aircraft door.

16. A system for an aircraft door situated in a fuselage of an aircraft, the system comprising:
a structural frame to engage an outer surface of the aircraft door, the structural frame supported over the aircraft door via support members configured to contact the fuselage of the aircraft at opposing sides of the aircraft door;
a coupler to temporarily couple the structural frame with the aircraft door;
a plurality of gasket channels on the structural frame having a size and shape to engage a gap between the aircraft door and the fuselage outside the aircraft;
one or more pumps fluidly coupled with the plurality of gasket channels to apply a pressure in the gap to simulate pressure applied to a seal between the aircraft door and the fuselage during flight of the aircraft; and
pressure gauges fluidly coupled with the plurality of gasket channels to detect a leak in one or more of the plurality of gasket channels,
wherein the support members are configured to extend to lift the structural frame and draw the aircraft door outwards to simulate a position of the aircraft door relative to the fuselage during flight of the aircraft.

17. The system of claim 16 wherein:
the coupler includes one or more suction cups attached to the structural frame.

18. The system of claim 16 wherein:
the plurality of gasket channels are additively manufactured with a material sized to engage the gap around a perimeter of the aircraft door.

19. The system of claim 16 wherein:
the plurality of gasket channels are segmented to be fluidly isolated from one another.

20. The system of claim 16 wherein:
the support members include tension levers to lift the structural frame.

* * * * *